United States Patent Office 3,281,347
Patented Oct. 25, 1966

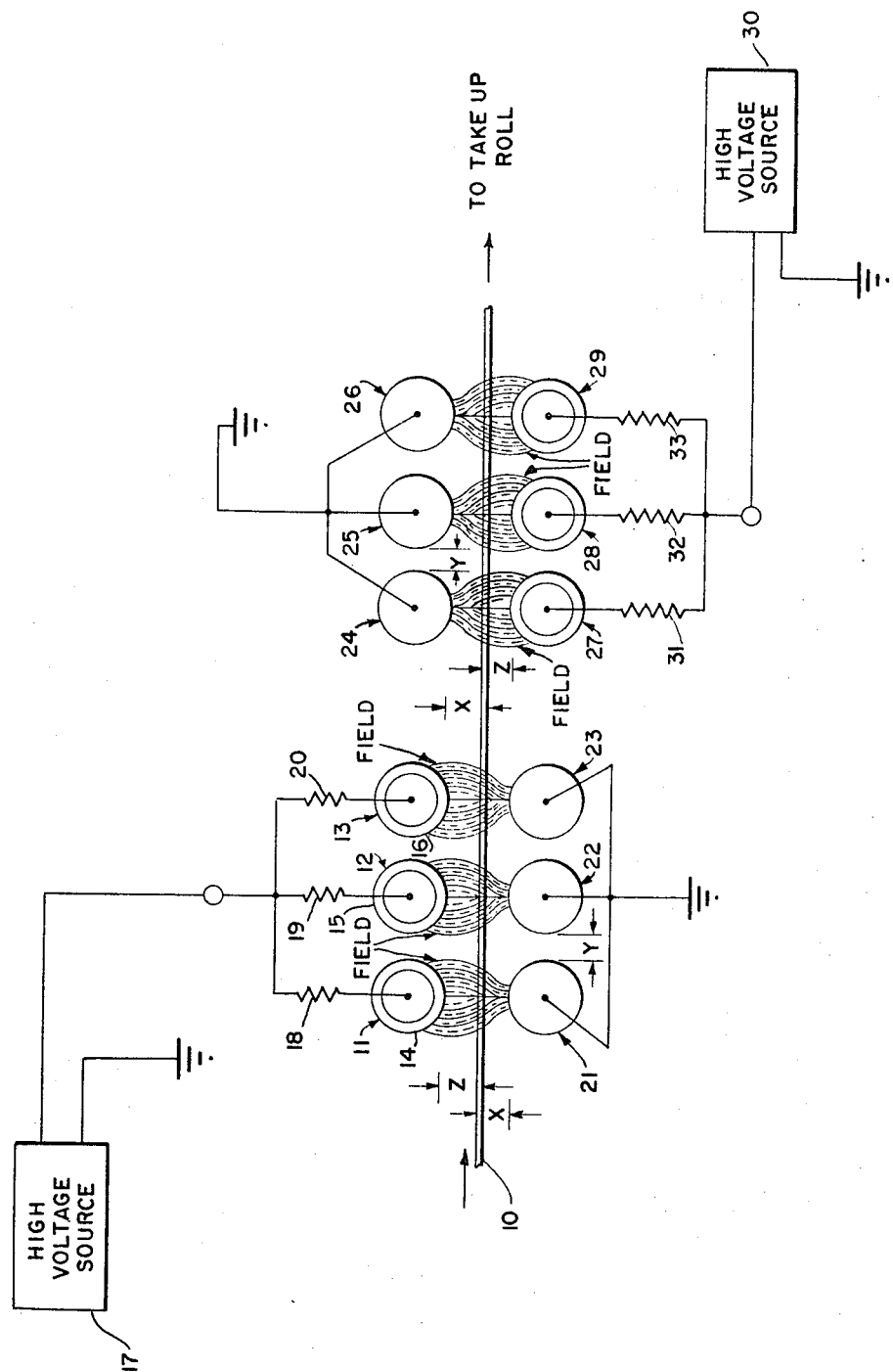

3,281,347
METHOD AND APPARATUS FOR TREATING PLASTIC COATED PAPER
Ronald P. H. Winder, Lexington, Mass., assignor to International Paper Company, New York, N.Y., a corporation of New York
Filed July 13, 1962, Ser. No. 209,594
11 Claims. (Cl. 204—168)

The present invention relates to the treatment of plastic coated paper, and more particularly to the treatment of plastic coated paper to improve the adherence of ink and adhesives thereto. The principal utility of the invention at the present time resides in the treatment of polyethylene coated paper, and, for convenience, the invention will be described primarily in connection with treatment of such polyethylene coated paper. But it should be understood that the principles of the invention are applicable to the treatment of other plastics which may be coated on paper and which plastics exhibit generally similar response to the treatment of the invention, particularly polymers and copolymers of the lower olefins. Similarly, the principles of the invention are also applicable to the treatment of certain plastic coated substrates other than paper.

Various treatments for the surfaces of polyethylene and other plastic sheet materials to render them adherent to ink and glue have been suggested and used. Passing polyethylene through an electrical corona discharge is one of such treatments, and the general process involved is illustrated in a number of patents which have issued in recent years. These patents show considerable diversity in method and apparatus. Examples of the patents in the field of electrically treating polyethylene sheet material are British Patent 715,914, issued September 22, 1954; Berthold et al. United States Patent 2,881,470, issued April 14, 1959; Cunningham United States Patent 2,882,412, issued April 14, 1959; Parks United States Patent 2,939,956, issued June 7, 1960; and Traver United States Patent 3,018,189, issued January 23, 1962.

The present invention is particularly concerned with the treatment of both polyethylene surfaces of a paper web which has been coated on both sides with a film of polyethylene. A principal object of the invention has been the provision of a novel and improved method and apparatus for treating simultaneously both sides of a polyethylene coated paper web to improve the adherence thereto of glue, ink and the like.

The principles of the invention are applicable to a broad range of polyethylene thicknesses and a broad range of paper thicknesses. By way of example, the invention can be used with polyethylene coatings of the order of ¼ mil or less in thickness and 2 mils or more in thickness. Again by way example, the invention can be used with papers ranging from relatively thin kraft paper to relatively heavy boxboard.

An important object of the invention has been to provide a method and apparatus for treating polyethylene coated paper which is readily usable with a wide range of both plastic and paper thicknesses.

Still another object of the invention has been the provision of such a method and apparatus which yields maximum polyethylene surface treatment with minimum volume treatment.

A further object of the invention has been the provision of such a method and apparatus which can efficiently treat polyethylene coated paper having different polyethylene thicknesses on the respective sides.

Another object of the invention has been to provide such a method and apparatus which avoid the formation of pinholes in the polyethylene coated paper even when operating at low coating weights.

Another object of the invention has been to provide such a method and apparatus which will produce a treatment that will not deteriorate substantially during storage over an extended period of time, e.g., two years or more.

Other and further objects, features and advantages of the invention will appear more fully from the following description, taken in connection with the accompanying drawing which illustrates schematically one form of apparatus embodying the invention for carrying out the method of the invention.

Referring now to the drawing, reference numeral 10 refers to a paper web both surfaces of which are provided with a polyethylene coating. The polyethylene coating may be applied to each side of the paper simultaneously or first to one side and then to the other. In the drawing, the web 10 is fed from left to right and will preferably be advanced at a relatively high speed, e.g., 400 feet per minute, or more. The web should be maintained under a substantial tension so that it will not be deflected appreciably by electrostatic forces acting thereon.

A set of spaced, parallel rolls 11, 12 and 13 is disposed above the web 10 with the axes of the rolls being at right angles to the direction of advance of the web. The axes of rolls 11–13 should be parallel to the web. The length of each of the rolls 11–13 should be at least equal to the width of the web.

The diameter of the rolls 11–13 may be selected over a wide range, but preferably will be of the order of 1½″. Each of the rolls is provided with a thin outer dielectric coating, designated 14, 15 and 16, respectively, which should be carefully selected both as to material and thickness. The remainder of each of the rolls 11–13, or at least the portion thereof underlying the dielectric coating, should be electrically conductive and typically might be made of steel. The rolls 11–13 need not be solid but may be in the form of hollow cylinders. The rolls 11, 12 and 13 are coupled to the high (as distinguished from ground) voltage terminal of a high voltage source 17 through equalizing resistors 18, 19 and 20, respectively.

A second set of spaced, parallel rolls 21, 22 and 23 is disposed below the web 10 with the axes of rolls 21, 22 and 23 being aligned with the axes of rolls 11, 12 and 13, respectively. Rolls 21–23 may be identical to rolls 11–13 except that rolls 21–23 will not have a dielectric surface but instead a conductive surface. The rolls 21–23 are each connected to ground.

A set of grounded rolls 24, 25 and 26 is disposed above web 10 at a point spaced from rolls 11–13 along the direction of web advance. A set of dielectric covered rolls 27, 28 and 29 is disposed beneath the web 10 and in axial alignment with the respective rolls 24, 25 and 26. The rolls 24–26 may be identical to the rolls 21–23. The rolls 27–29 may be identical to the rolls 11–16 and are coupled to the high side of a second high voltage source 30 through respective equalizing resistors 31, 32 and 33.

The spacing between rolls 11–13 and web 10 and between rolls 27–29 and web 10 is designated dimension "Z" and may be varied from a minimum of about ¼″ to a maximum of about 1″. The spacing between adjacent rolls in any of the sets is designated dimension "Y" and may be varied from a minimum of about 2″ to a maximum of about 4″. The spacing between rolls 21–23 and web 10 and between rolls 24–26 and web 10 is designated dimension "X" and may be varied from a minimum of about ¼″ to a maximum of about 1″. It is desirable that the rolls be adjustably spaced from the web so as to permit adjustment of the dimensions X and Z.

The high voltage sources 17 and 30 may be of any suitable type to establish a high voltage corona discharge in the region between aligned rolls. Typically, the voltage between aligned rolls might be of the order of 2 to 9 kv. peak and may be supplied at a high frequency, e.g., 250 kc., although a low frequency or even D.C. may be used. The sources 17 and 30 might be, for example, of the type shown in United States Patent 2,583,979 to Weitmann, which issued January 29, 1952, and arranged to supply the operating high voltage through a transformer. For any particular electrode spacing and configuration, the voltage used should be insufficient to result in an arc discharge.

The dielectric coverings provided on the rolls 11–13 and 27–29 may be varied depending upon materials and operating conditions. A 1/8" layer thickness produces satisfactory results, but for prolonged commercial operations a 3/16" layer is preferred. A number of dielectric materials may be used for the coverings on rolls 11–13 and 27–29, but so far as is known best results will be obtained with a chlorosulfonated polyethylene sold under the trademark Hypalon 20, which has a dielectric strength of about 400–750 volts/mil. The dielectric covering preferably has a dielectric constant of about 4, a hardness of 80 (as measured on a Shore durometer) and a substantial resistance to chemical breakdown under the action of ozone.

The electrostatic field between aligned rolls is shown schematically in the drawing. The field established between corresponding electrodes, i.e., aligned rolls, serves to ionize the air in the space between the electrodes to cause a corona discharge. The field extends through two dielectric layers, the first being formed by the dielectric coating on the high voltage electrode, e.g., the dielectric coating 14 on roll 11. The other dielectric layer is formed by the web 10 and consists of the paper and the polyethylene coating on each surface thereof. The dielectric layers serve to distort the field, spreading out the field in the region between the dielectric coated roll and the web, so that the effective axial extent of the field at the web is slightly greater than the roll diameter. Between the web and the grounded roll the field tapers down to a relatively narrow neck at the conductive surface of the grounded roll. The spreading out of the field causes the greater part of the energy of the corona discharge to be effective on the polyethylene surface facing the dielectric covered roll. Viewed in another way, the effect is to yield a maximum surface treatment with a minimum volume treatment, thereby maximizing the energy effective for treatment per square inch of web.

An important advantage accruing from the spreading out of the field is that it minimizes the danger of pinhole formation in the polyethylene coatings. In general, it has been found that pinhole formation resulting from localized ionizing stresses is a greater problem in treating polyethylene coated paper than it is in treating unsupported film, probably because of the presence of air pockets in the film-paper interface and the projection of paper surface irregularities into the polyethylene film.

The dielectric layers also act as rectifiers and have a stabilizing effect on the field.

The axial spacing between adjacent aligned rolls, i.e., dimension Y, should be sufficient to prevent substantial overlap between the corresponding fields. If adjacent rolls are supplied from separate high voltage sources, as in the case of electrodes 13–24 and 23–27, the axial spacing should be sufficient to prevent ionization of the air space therebetween at peak-to-peak inverse voltage.

The degree of treatment of the polyethylene surfaces is basically dependent on the energy (volt-amperes) of the corona discharge to which the polyethylene surfaces are subjected. But it is not necessary that this energy be concentrated. Indeed, in treating polyethylene coated paper it is desirable that it be spread out to avoid pinhole formation. A first spreading out is effected by dividing the treatment into two major zones, in the first of which (between rolls 11–13 and 21–23, respectively) the upper polyethylene surface receives the major part of the treatment, and in the second of which (between rolls 24–26 and 27–29, respectively), the lower polyethylene surface receives the major part of the treatment. Additional spreading out is achieved by dividing each zone into a plurality of treatment areas each serviced by a respective pair of electrodes. Three such areas are shown for each zone, but this number may be varied and in general will be increased for higher web speeds. Lastly, and probably most important, the individual fields between cooperating electrodes are distorted so as to maximize the longitudinal extent of the field at the web.

The electrode structures have been described and illustrated as rolls and usually the cylindrical shape will be the most desirable. But other curved shapes can be used, and those portions of the electrodes not effective in field formation may be eliminated or otherwise shaped. For example, instead of cylindrical surfaces, semi-cylindrical surfaces might be used. The radius of curvature employed should be sufficiently small to facilitate ionization and formation of a corona discharge at a reasonable voltage. However, very small radii or sharp or pointed surfaces should be avoided to prevent field concentration which would increase the danger of pinhole formation.

For satisfactory operation, it is important that the web 10 be maintained under substantial tension so that the web-electrode spacing will not vary appreciably as the web advances. Similarly, it is important that the web be kept flat and free of wrinkles so that the web-electrode spacing will not vary across the width of the web.

The corona discharge acting on the polyethylene surface alters the surface characteristics through a mechanism which is not clearly understood but which may involve chemical and/or potential distribution effects. In any event, the action of the corona discharge (and/or the action of the ozone produced thereby) on the polyethylene surface improves the characteristics of that surface with respect to retention of ink and with respect to retention of adhesives, thus facilitating subsequent printing or gluing of the polyethylene surface. Moreover, it appears that this treatment does not adversely affect the heat sealability characteristics of the polyethylene.

While the invention has been described in connection with a specific embodiment thereof and in a specific use, various modifications thereof will occur to those skilled in the art without departing from the spirit and scope of the invention as set forth in the appended claims.

What is claimed is:

1. The method of treating a web having a plastic coating on both surfaces thereof to improve the ink adherence and gluability characteristics of the outer surfaces of said plastic coatings, comprising passing said web successively through first and second treatment zones, creating in each of said zones a plurality of separate high voltage corona discharges, each of said discharges being established between a respective pair of spaced electrodes each extending laterally across said web and each having an arcuate surface facing a respective plastic surface of said web, and maintaining said web substantially flat and out of contact with said electrodes while advancing said web through said zones, the arcuate electrode surfaces facing one plastic surface in one of said zones each having a thin outer dielectric layer, the arcuate electrode surfaces facing the other plastic surface in the other of said zones each having a thin outer dielectric layer and the remaining arcuate electrode surfaces having conductive outer faces.

2. The method of treating a paper web having a polyethylene coating on both surfaces thereof to improve the ink adherence and gluability characteristics of the outer surfaces of said polyethylene coatings, comprising passing said web successively through first and second treatment zones, creating a separate high voltage corona discharge in each of said zones, each of said discharges being established between a respective pair of spaced electrodes each extending laterally across said web and each having an arcuate surface facing a respective polyethylene surface of said web, and maintaining said web substantially flat and out of contact with said electrodes while advancing said web through said zones, the arcuate electrode surface facing one polyethylene surface in one of said zones having a thin outer dielectric layer and the arcuate electrode surface facing the other polyethylene surface in the other of said zones having a thin outer dielectric layer.

3. The method of treating a paper web having a polyethylene coating on both surfaces thereof to improve the ink adherence and gluability characteristics of the outer surfaces of said polyethylene coatings, comprising passing said web successively through first and second treatment zones, creating a separate high voltage corona discharge in each of said zones, each of said discharges being established between a respective pair of spaced electrodes each extending laterally across said web and each having an arcuate surface facing a respective polyethylene surface of said web, and maintaining said web substantially flat and out of contact with said electrodes while advancing said web through said zones, the electrode surface facing one polyethylene surface in one of said zones having a thin outer dielectric layer, the electrode surface facing the other polyethylene surface in the other of said zones having a thin outer dielectric layer and the remaining electrode surfaces having conductive outer faces.

4. The method of treating a paper web having a polyethylene coating on both surfaces thereof to improve the ink adherence and gluability characteristics of the outer surfaces of said polyethylene coatings, comprising passing said web successively through first and second treatment zones, creating in each of said zones a plurality of separate high voltage corona discharges, each of said discharges being established between a respective pair of spaced electrodes each extending laterally across said web and each having an arcuate surface facing a respective polyethylene surface of said web, and maintaining said web substantially flat and out of contact with said electrodes while advancing said web through said zones, the arcuate electrode surfaces facing one polyethylene surface in one of said zones each having a thin outer dielectric layer, the arcuate electrode surfaces facing the other polyethylene surface in the other of said zones each having a thin outer dielectric layer and the remaining arcuate electrode surfaces having conductive outer faces.

5. The method set forth in claim 4 in which each electrode surface is spaced from said web at its closest point by a distance lying in the range of about ¼" to 1".

6. The method of treating a paper web having a polyethylene coating on both surfaces thereof to improve the ink adherence and gluability characteristics of the outer surfaces of said polyethylene coatings, comprising passing said web successively through first and second treatment zones, creating in each of said zones a plurality of separate high voltage corona discharges, each of said discharges being established between a respective pair of spaced cylindrical electrodes each extending laterally across said web and being parallel to and spaced from said web by a distance lying in the range of about ¼" to 1", the electrodes facing one of said polyethylene surfaces in one of said zones having a thin outer dielectric coating, the electrodes facing the other of said polyethylene surfaces in the other of said zones having a thin outer dielectric coating and the remaining electrodes having outer conductive surfaces electrically grounded, and maintaining said web substantially flat and under tension while advancing the same through said zones whereby the spacing between said web and each of said electrodes remains substantially constant.

7. Apparatus for treating the outer surfaces of polyethylene coatings bonded to each side of the paper web, comprising means to advance said web under tension successively along a path through first and second treatment zones, a first group of electrode structures in each of said zones, said electrodes of said first group having arcuate surfaces disposed facing, spaced from and parallel to said path and one surface of said web in said path, a second group of electrode structures in each of said zones, said electrodes of said second group having arcuate surfaces disposed facing, spaced from and parallel to said path and the other surface of said web in said path, each of said electrode surfaces extending transversely across said path and said web, each of the electrode surfaces in said first groups being aligned with a corresponding electrode in said second groups thereby forming a first set of pairs of aligned electrodes in said first zone and a second set of pairs of aligned electrodes in said second zone, the electrode surfaces of said first set of pairs facing said one surface of said web and the electrode surfaces of said second set of pairs facing said other surface of said web having thin outer dielectric surfaces and the remaining electrode surfaces having electrically conductive outer surfaces, a source of high voltage electric power, and means to supply said power to the electrodes of each pair of electrodes thereby to create a separate corona discharge between each pair of electrodes.

8. Apparatus for treating the outer surfaces of polyethylene coatings bonded to each side of the paper web, comprising means to advance said web under tension successively along a path through first and second treatment zones, a first group of parallel cylindrical electrodes in each of said zones and disposed facing, spaced from and parallel to said path and one surface of said web in said path, a second group of parallel cylindrical electrodes in each of said zones and disposed facing, spaced from and parallel to said path and the other surface of said web in said path, each of said electrodes extending transversely across said path and said web, each of the electrodes in said first groups being aligned with a corresponding electrode in said second groups thereby forming a first set of pairs of aligned electrodes in said first zone and a second set of pairs of aligned electrodes in said second zone, the electrodes of said first set of pairs facing said one surface of said web and the electrodes of said second set of pairs facing said other surface of said web having thin outer dielectric surfaces and the remaining electrodes having electrically conductive outer surfaces, a source of high voltage, high frequency electric power, and means to supply said power to the electrodes of each pair of electrodes thereby to create a separate corona discharge between each pair of electrodes.

9. Apparatus as set forth in claim 8 in which each electrode surface is spaced from said web at its closest point by a distance lying in the range of about ¼" to 1".

10. Apparatus for treating the outer surfaces of polyethylene coatings bonded to each side of the paper web, comprising a source of high voltage, high frequency electric power, means to advance said web under tension along a path successively through first and second treatment zones, a first plurality of spaced electrodes each having an arcuate face facing and spaced from said path and one surface of said web and extending laterally across said path and said web in said first zone, a second plurality of spaced electrodes each having an arcuate face facing and spaced from said path and the other surface of said web and extending laterally across said path and said web in alignment with a respective electrode of said first plurality, a third plurality of spaced electrodes each having an arcuate face facing and spaced from said path and said one surface of said web and extending laterally across said path and said web in said second zone, a fourth plurality of spaced electrodes each having an arcuate face facing and spaced from said path and said other surface of said web and extending laterally across said path and said web in alignment with a respective electrode of said third plurality, the electrodes of said first and fourth pluralities each having a thin outer dielectric surface and the electrodes of said second and third pluralities each having an electrically conductive outer surface, means to supply said power to said electrodes thereby to create a separate corona discharge between each pair of aligned electrodes of said first and second pluralities and a separate corona discharge between each pair of aligned electrodes of said third and fourth pluralities.

11. Apparatus for treating the outer surfaces of polyethylene coatings bonded to each side of the paper web, comprising first and second sources of high voltage, high frequency electric power, means to advance said web under tension along a path successively through first and second treatment zones, a first plurality of spaced electrodes each having an arcuate face facing and spaced from said path and one surface of said web and extending laterally across said path and said web in said first zone, a second plurality of spaced electrodes each having an arcuate face facing and spaced from said path and the other surface of said web and extending laterally across said path and said web in alignment with a respective electrode of said first plurality, a third plurality of spaced electrodes each having an arcuate face facing and spaced from said path and said one surface of said web and extending laterally across said path and said web in said second zone, a fourth plurality of spaced electrodes each having an arcuate face facing and spaced from said path and said other surface of said web and extending laterally across said path and said web in alignment with a respective electrode of said third plurality, the electrodes of said first and fourth pluralities each having a thin outer dielectric layer and the electrodes of said second and third pluralities each having an electrically conductive outer surface, means to couple said first source of power to said first and second pluralities of electrodes thereby to create a separate corona discharge between each pair of aligned electrodes of said first and second pluralities, and means to couple said second source of power to said third and fourth pluralities of electrodes thereby to create a separate corona discharge between each pair of aligned electrodes of said third and fourth pluralities.

References Cited by the Examiner
UNITED STATES PATENTS

| | | | |
|---|---|---|---|
| 2,810,933 | 10/1957 | Pierce et al. | 204—312 |
| 3,017,339 | 1/1962 | Dewey | 204—165 |
| 3,067,119 | 12/1962 | Ramaika | 204—168 |

JOHN H. MACK, *Primary Examiner.*

H. S. WILLIAMS, *Assistant Examiner.*